United States Patent Office 3,318,422
Patented May 9, 1967

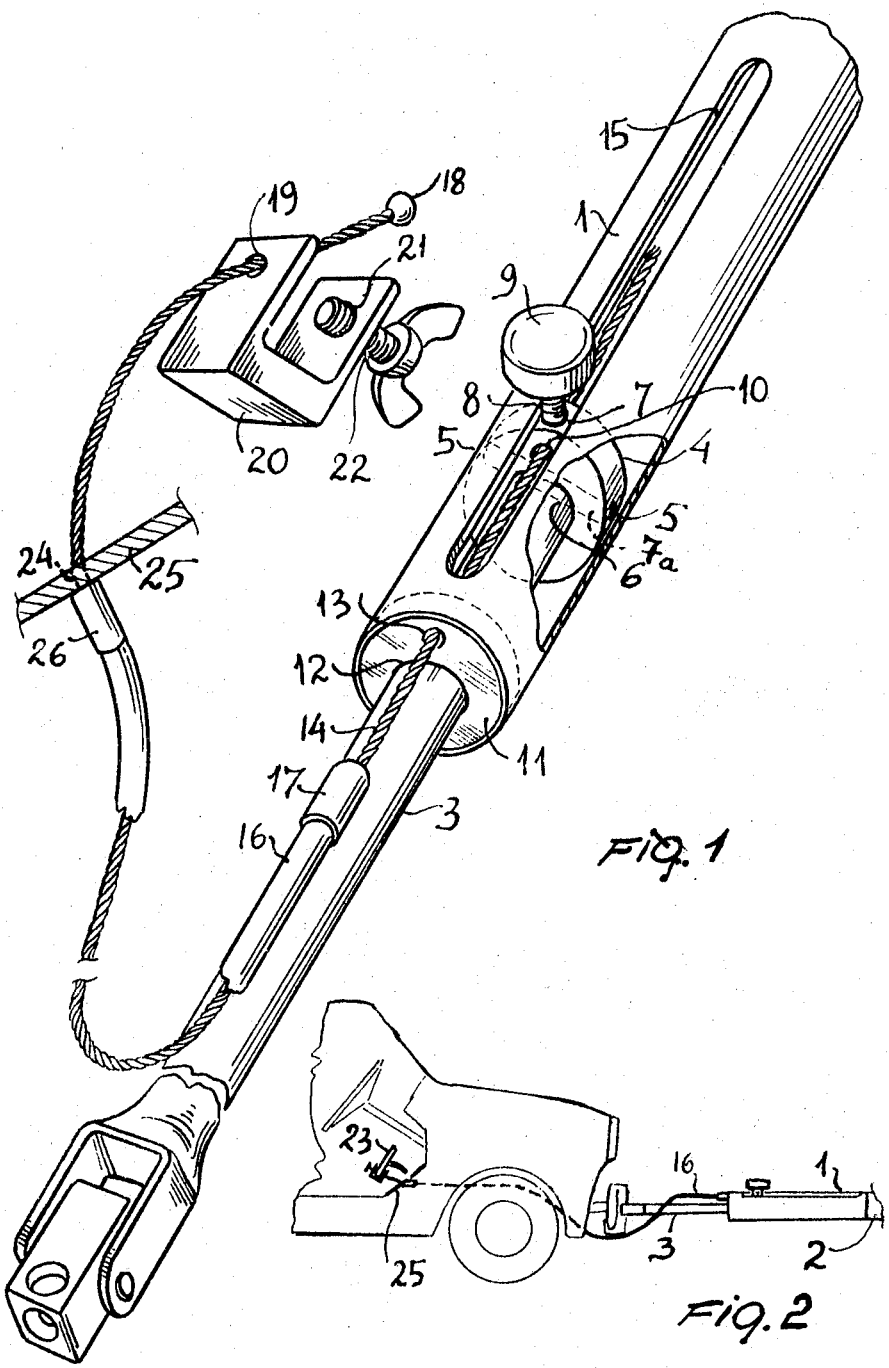

3,318,422
TOW BAR CONTROLLED BRAKE ACTUATING DEVICE FOR TOWED VEHICLES
Eugenio Frescura, Via Alberto da Prezzate 31, Bergamo, Italy
Filed Oct. 25, 1965, Ser. No. 505,179
Claims priority, application Italy, Oct. 27, 1964, 23,108/64, Patent 739,160
5 Claims. (Cl. 188—112)

This invention relates to a tow bar controlled brake actuating device for towed vehicles.

The device is particularly suitable for tow bars consisting of a tubular outer member and a stem member elastically slidable within the outer tubular member, of the type described in my co-pending U.S. application Ser. No. 395,523, filed Sept. 10, 1964, now abandoned.

A known problem in towing vehicles by means of tow bars is the braking action. In fact, when the towing vehicle brakes, the inertia of the towed vehicle immediately acts on the towing vehicle, without giving possibility to the driver of the towed vehicle to actuate in time the brake. The inertia forces may, in certain cases, be so great as to damage the bumpers or to jeopardize the braking of the concerned vehicles.

This problem has been solved according to this invention, by providing a device which will automatically press the pedal of the brake of the towed vehicle, when actuated by one of the tow bar members. This device includes preferably a Bowden cable connected at one end with a tow bar member and at the other end with the brake pedal.

One of the objects of the present invention is to provide such brake actuating device with such a structure as to be easily mounted on any kind of existing vehicle and to be easily connected with the corresponding member of the tow bar of the described type.

Another object is to provide a simple, economical and reliable device of the described type which will occupy a reduced space and be easily transportable.

Further objects and characteristics of the device according to the invention, will be apparent from the following description of a preferred embodiment of the invention, represented in the annexed drawing, in which:

FIG. 1 shows a perspective view of the device, and
FIG. 2 shows a diagrammatical overall view of the connection of the device.

With reference to the drawing, the device comprises a tubular extension 1 rigidly connected to the outer tubular member 2 of the tow bar described in my above mentioned co-pending application. The connection may be carried out in any known manner, but it is preferred to connect the tubular extension 1 to the tubular member 2 by means of screw threads provided in the mating parts of these members.

Rigidly secured on the stem member 3 of the tow bar is a ring 4, which is provided with a through-hole 5, which, in the connected position of the ring 4 is aligned with a through-hole 6 in stem 3 and through these aligned holes 5 and 6 is passed a locking pin 7a which maintains the ring 4 fixed on the stem member 3. The ring 4 is adapted to slide within the tubular extension member 1 when stem member 3 is elastically moved relative to members 2 and 1. Ring 4 is also provided with an additional hole 7, which is internally threaded and is arranged preferably perpendicular to the through-hole 5 of the same ring 4.

Screwed in the threaded hole 7 is a locking screw 8 provided with a handwheel-like head 9. The ring 4 is further provided with a cross bore 10 which crosses the width of the ring 4 and crosses also with the threaded hole 7. Fixed on the free end of the tubular extension 1 is a cap member 11, provided with a central bore 12, allowing the passage of the stem member 3 of the tow bar. Cap member 11 has aligned with the hole 10 of the ring 4 a through-hole 13 extending parallel to the stem member 3 and having a diameter equal to the diameter of hole 10.

The cable 14 of the Bowden is passed through the holes 13 and 10 and has a diameter slightly smaller than that of the mentioned holes so that it may slide easily within such holes. Through the lock screw 8 the cable 14 is fixed in the ring 4.

To allow access to the screw 8 a longitudinal slot 15 is provided in the tubular extension member 1, so that the ring 4 may freely perform relative movements with respect to member 1 even if the screw 8 is screwed in the corresponding hole 7 and the cable 14 is fixed therein.

The sheath member 16 of the Bowden has a diameter greater than that of the hole 13, so that the end 17 of the sheath is stopped by the cap member 11, which acts as a stop for the mentioned sheath end.

The other end of the cable 14 is provided with a head 18 fixed in a hole 19 of a yoke member 20, provided with a further threaded hole 21 in one arm thereof, in which a wing screw 22 is threaded. The yoke 20 is fixed on the pedal 23 of the towed vehicle by screwing in the wing screw 22 and the cable 14 is passed through a hole 24 provided in footrest plate portion 25 of the bodywork of the towed vehicle, in front of the brake pedal. The hole 24 has a diameter slightly greater than that of the cable 14 but smaller than the diameter of the end 26 of the sheath 16 of the Bowden. In this way the front footrest plate portion 25 acts as a stop for the end 26 of the sheath 16.

It will be appreciated that the sheath 16 of the Bowden continuously extends from end 17 stopped by the cap 11 up to the end 26 stopped by the member 25, whereas the cable of the Bowden extends from the pedal 23 up to the ring 4.

It will be further understood that the stem member 3 is connected with the bumper of the towed vehicle as described in the mentioned co-pending application. It will be further appreciated that it is preferable that the distance between the pedal 23 and the hole 24 is such as to be tangential to the path performed by the pedal during the braking action.

The operation of the device is as follows.

When the towing vehicle brakes, due to the action of inertia there will be relative movement of the tubular member 2 and consequently of its extension 1 with respect to the stem member 3 in the direction towards the end of the stem member which is connected on the bumper of the towed vehicle. Due to this relative displacement, the free end of the tubular extension member 1 will displace the end 17 of the sheath 16 in the same direction, i.e. there will be a relative displacement of the ring 4 together with the cable 14 in the opposite direction. Due to these relative movements, the cable 14 will be stretched and will pull the pedal 23 in the braking position.

It will be appreciated that all the component parts of the device according to the invention may be easily assembled and disassembled and with the equipment of the device a punch (not shown) may be provided for making the hole 24 in the footrest of the towed vehicle, if the device according to the invention is used for the first time.

I claim:

1. A tow bar controlled brake actuating device for towed vehicles, wherein the tow bar has an outer tubular member and an inner stem member elastically movable therein, in the longitudinal direction thereof, comprising a Bowden wire having a flexible sheath member and a cable member slidable therein, first fastening means for connecting one end of said cable member to the brake pedal of the towed vehicle, second fastening means for fixing the other end of said cable member on said stem of the tow bar, a first stop member rigid with said outer tubular member and adapted to stop the relative movement of one end of said sheath member with respect to said outer tubular member, a second stop member rigid with the frame of the towed vehicle and adapted to prevent relative movement of the other end of said sheath member with respect to said frame, thereby to pull said cable member and to actuate the brake when relative movement occurs between said outer tubular member and said stem member.

2. A brake actuating device according to claim 1, wherein said first fastening means is a yoke member having a wing screw adapted to fix said yoke member on said brake pedal.

3. A device according to claim 1, wherein said second fastening means is a ring member fixed on said stem member and having a first bore parallel to said stem member and adapted to receive an end of said cable member, a second bore perpendicular to said first bore and opening into said first bore, an inner screw thread in said second bore, a locking screw screwed in said second bore and adapted to fix therein said end of said cable member.

4. A device according to claim 1, wherein said first stop member comprises a tubular extension member coaxial with said tubular member and rigidly connected therewith, and spacingly surrounding said stem member, a cap member at the free end of said tubular extension member with an opening for said stem member, a bore in said cap member adapted to allow passage of said cable member therethrough and to prevent passage therethrough of said sheath member.

5. A device according to claim 1, wherein said second stop means is the front footrest plate portion of the bodywork of the towed vehicle and a bore provided therein said bore allowing the passage therethrough of said cable member and preventing the passage therethrough of said sheath member.

References Cited by the Examiner
UNITED STATES PATENTS 2,575,183   11/1951   Mettetal _____ 188—112

MILTON BUCHLER, *Primary Examiner.*

B. S. MOWRY, T. W. BUCKMAN, *Assistant Examiners.*